F. D. CLEVELAND.
APPARATUS AND PROCESS FOR POSITIONING FISH.
APPLICATION FILED NOV. 24, 1917.

1,362,396.

Patented Dec. 14, 1920.
2 SHEETS—SHEET 1.

F. D. CLEVELAND.
APPARATUS AND PROCESS FOR POSITIONING FISH.
APPLICATION FILED NOV. 24, 1917.

1,362,396.

Patented Dec. 14, 1920.
2 SHEETS—SHEET 2.

Inventor:
Francis D. Cleveland,
by his attorney, Charles S. Gooding.

UNITED STATES PATENT OFFICE.

FRANCIS D. CLEVELAND, OF CAMBRIDGE, MASSACHUSETTS, ASSIGNOR, BY MESNE ASSIGNMENTS, TO WILLIAM UNDERWOOD COMPANY, OF BOSTON, MASSACHUSETTS, A VOLUNTARY ASSOCIATION OF MASSACHUSETTS.

APPARATUS AND PROCESS FOR POSITIONING FISH.

1,362,396.  Specification of Letters Patent.  Patented Dec. 14, 1920.

Application filed November 24, 1917. Serial No. 203,708.

*To all whom it may concern:*

Be it known that I, FRANCIS D. CLEVELAND, a citizen of the United States, residing at Cambridge, in the county of Middlesex and State of Massachusetts, have invented new and useful Improvements in Apparatus and Processes for Positioning Fish, of which the following is a specification.

This invention relates to an improved method of handling fish and to an improved chute whereby said method may be carried into practical operation and said fish fed down said chute head first into machines for cutting the heads off. Heretofore it has been customary in certain classes of fish cutting machines to employ fluid means, such as water, for placing the fish upon a carrier in correct position to have the heads severed by a cutter. The use of water entails a certain amount of expense for pumping the same and also, as the water used is generally salt water, the machinery is rusted thereby, and furthermore it is necessary to use a very large amount of water in order to assist the fish to move into position on the carriers and this necessarily not only causes the machine but causes the portion of the shop or factory surrounding it to be continually wet and uncomfortable for those who are operating the machine.

It is the object of this invention to do away with the foregoing objections to the fluid method of placing fish in position upon a carrier in readiness to have the heads severed, by omitting the fluid and using a chute having a glazed and undulating inclined surface, whereby fish may be positioned upon the carrier without using any water and utilizing the force of gravity alone to propel the fish into position to be operated upon.

The invention consists in the improved method of handling fish hereinafter described, which consists in feeding the fish down a glazed and undulating inclined surface and, further, the invention consists in the chute for positioning the fish, said chute having a glazed and undulating upper surface whereby fish moving down the chute will be turned so as to slide head first.

The invention further consists in the combination and arrangement of parts set forth in the following specification and particularly pointed out in the claims thereof.

Referring to the drawings.

Like numerals refer to like parts throughout the several views of the drawings.

Figure 1:
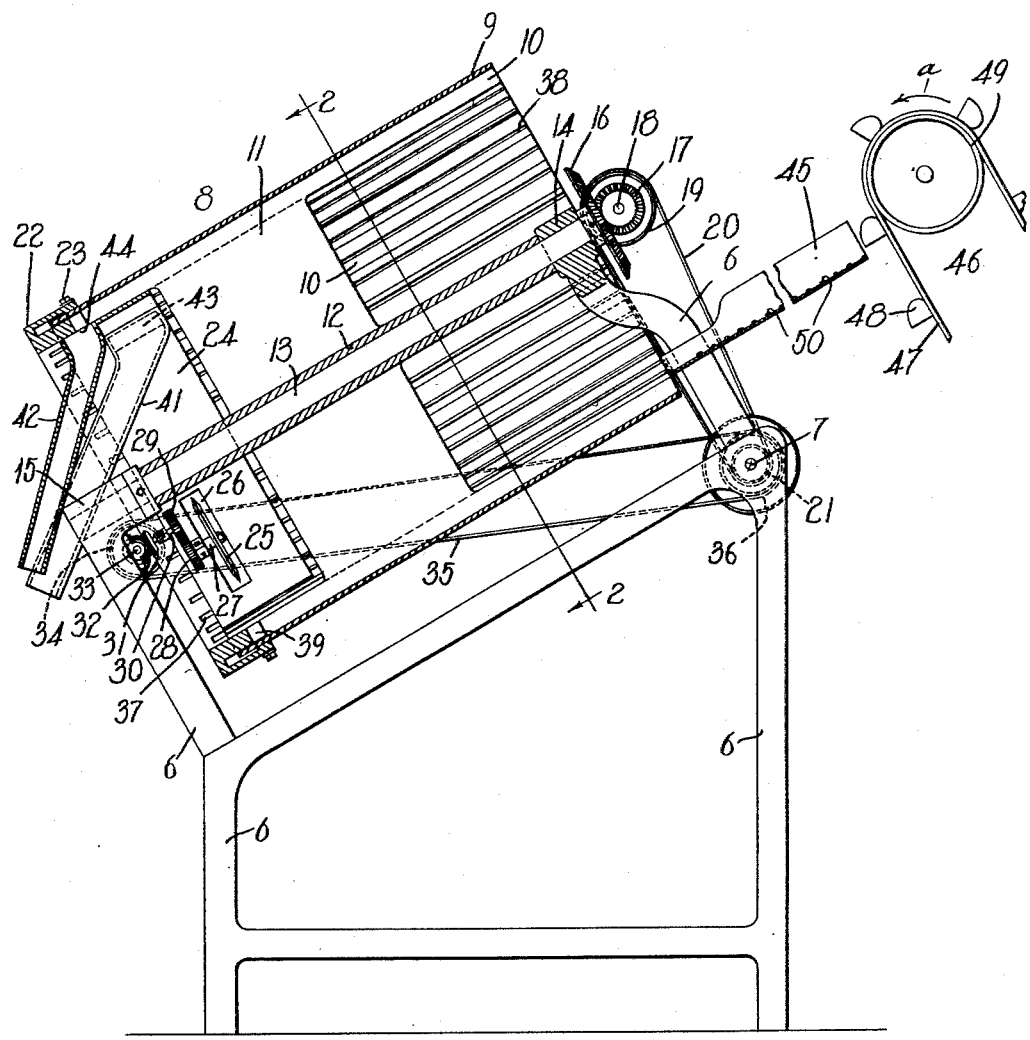
Figure 1 is a vertical sectional elevation of a fish cutting machine embodying my invention.
Figure 2:
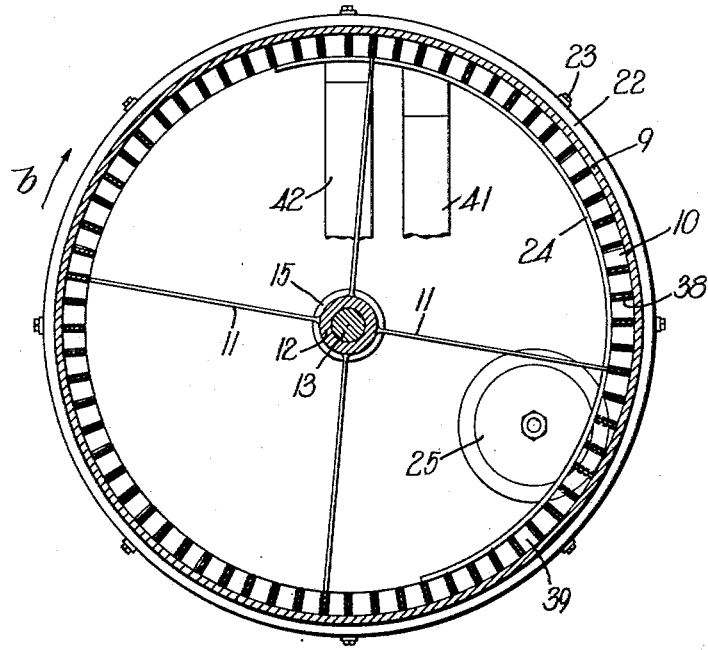
Fig. 2 is a detail end section taken on line 2—2 of Fig. 1.
Figure 4:
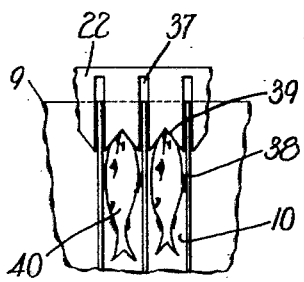
Fig. 4 is a detail plan of a portion of the gage and buckets.

In the drawings, Figs. 1 to 4 inclusive, 6 is the frame of the machine, 7 is the main driving shaft, 8 is the carrier upon which the fish are cut, consisting of a hollow drum 9 with pockets 10 arranged around the inner face of said drum. The drum 9 is connected by arms 11 to a hollow sleeve 12 which is fastened to a shaft 13 journaled to rotate in bearings 14, 15 upon the frame of the machine. The shaft 13 and drum 8, together with the buckets 10, are arranged at an angle to a horizontal plane.

A rotary motion is imparted to the carrier 8 by a bevel gear 16 which is fastened to the shaft 13 and is driven by a bevel pinion 17 fast to a shaft 18, the shaft 18 having a pulley 19 fast thereto, to which a rotary motion is imparted by a belt 20 from a pulley 21 fast to the main shaft 7.

An annular gage 22 is adjustably fastened to the lower end of the carrier 8 at the lower ends of the pockets 10 by any suitable means, such as set-screws 23.

A shield 24 extends part way around the carrier 8 adjacent to the inner edges of the pockets 10 and a rotary cutter 25 projects into the pockets 10, which are slotted to allow the same so to do, said rotary cutter extending through a slot 26 in the shield 24 and having a rotary motion imparted thereto by a shaft 27 which is rotated by a gear 28 which meshes into another gear 29 fast to a shaft 30. The shaft 30 is rotated by a bevel gear 31 which meshes into a bevel gear 32 fast to a shaft 33 to which a rotary motion is imparted by a pulley 34. The pulley 34 is connected by a belt 35 to a pulley 36 fast to the shaft 7.

The gage 22 is slotted at 37 to allow the partition 38 of the pockets 10 to project thereinto and to allow said gage to be adjusted longitudinally of the pockets so that the position of the fish may be changed relatively to the cutter 25. Said gage 22 has V-shaped pockets or recesses 39 on its inner edge into which the heads of the fish 40 project and against which they stop.

Adjacent to the upper end of the shield 24 two chutes 41 and 42 are arranged to receive the bodies and heads, respectively, of the fish and the shield 24 is cut away at 43 and 44 to form passages through which the bodies and heads of the fish, respectively, may pass into the chutes 41 and 42.

A chute 45 is arranged at an angle to a horizontal plane to deliver fish into the pockets 10 and fish are supplied to said chute by an elevator 46 having a chain conveyer 47 with buckets 48 thereon which carry the fish up and over the wheel 49 and dump them onto the chute 45. Said chute 45 is provided with ribs 50 which extend across the upper surface of said chute transversely thereof. These ribs are arranged to engage the tails or fins of fish which may be descending the chute tail first and cause said fish to turn around so that they will proceed down the chute head first, into the pockets 10 and against the gage 22. The upper surface of the chute 45 is glazed, thus presenting a slippery glass-like surface, over which the fish readily slip without the use of water.

Figure 3:
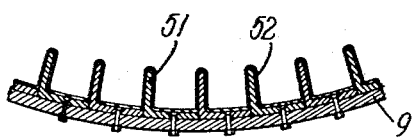
Fig. 3 is an enlarged section of several buckets taken on line 2—2 of Fig. 1.

By reference to Fig. 3 it will be seen that the pockets are made of metal angle pieces 51 having enameled surfaces 52 forming a glazed, slippery, glass-like surface which presents very little friction and over which the fish readily slip without the use of water.

Figure 5:
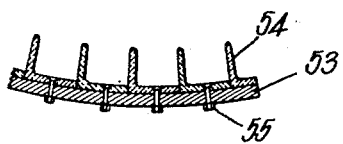
Fig. 5 is a transverse section of several buckets of a modified form of my invention.

In Fig. 5 a modified form of pocket is illustrated in which 53 is the rim of the drum and 54 are angle pieces made of glass and fastened to the rim 53 by bolts 55.

The general operation of the machine hereinbefore specifically described is as follows: The fish are carried upwardly in the direction of the arrow *a* by the buckets 48 of the elevator 46 and dumped onto the chute 45, down which they slide. Thus fish which are head first continue moving in that direction and those fish which are tail first on the chute will be turned as they move down said chute and the tails or fins engage the ribs 50 upon the chute 45 so that they will move head first down said chute. The fish pass from the chute 45 into the pockets 10, down which they slide until their heads come into contact with the gage 22. As the carrier 8 rotates the fish will be carried in the direction of the arrow *b* (Fig. 2) and behind the shield 24 until they arrive at the cutter 25, where their heads are severed from the bodies. The heads and bodies then pass upwardly still in the pockets until the bodies arrive opposite the opening 43, when they will drop out of the pockets into the chute 41 and will pass down said chute 41 out of the machine to a suitable receptacle. The heads, when they arrive opposite the opening 44, will pass through said opening and down the chute 42 into a suitable receptacle.

It will be understood that the surface of the pockets 10 is a glazed surface and my invention contemplates a glazed surface, whatever the material may be of which it is constructed; for example, the surface may be formed of glass, crockery, china or enamel ware of any kind as distinguished from a metal surface which is not glazed.

Having thus described my invention, what I claim and desire by Letters Patent to secure is:

1. An inclined chute for positioning fish having a glazed undulating upper surface whereby fish moving down said chute will be turned to slide head first.

2. An inclined chute for positioning fish having a glazed upper surface and baffle members extending transversely of said chute whereby fish moving down said chute will be turned to slide head first.

3. An inclined chute for positioning fish and baffle members extending transversely of said chute, the upper surface of said chute and of said baffle members having a glazed surface whereby fish moving down said chute will be turned to slide head first.

4. The herein described method of handling fish which consists in feeding the fish down a glazed and undulating inclined surface.

In testimony whereof I have hereunto set my hand in presence of two subscribing witnesses.

FRANCIS D. CLEVELAND.

Witnesses:
 CHARLES S. GOODING,
 SYDNEY E. TAFT,